United States Patent
Ginty

(10) Patent No.: US 11,972,120 B2
(45) Date of Patent: Apr. 30, 2024

(54) SYSTEM AND METHOD OF FORECASTING AN AMOUNT OF TIME A SOLID STATE DRIVE CAN BE UNPOWERED

(71) Applicant: Dell Products L.P., Round Rock, TX (US)

(72) Inventor: Anthony Gerard Ginty, Cork (IE)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 17/443,962

(22) Filed: Jul. 29, 2021

(65) Prior Publication Data

US 2023/0035529 A1 Feb. 2, 2023

(51) Int. Cl.
G06F 3/06 (2006.01)

(52) U.S. Cl.
CPC .......... *G06F 3/0625* (2013.01); *G06F 3/0655* (2013.01); *G06F 3/0679* (2013.01)

(58) Field of Classification Search
CPC .............. G06F 11/076; G06F 11/1048; G06F 11/3034; G06F 11/30; G06F 11/3055; G06F 11/3058; G06F 11/106; G06F 3/0619; G06F 3/0625; G06F 3/0679; G06F 3/064; G06F 3/0616; G06F 12/0246; G11C 29/52; G11C 29/50016; G11C 16/34
See application file for complete search history.

(56) References Cited

U.S. PATENT DOCUMENTS

| | | | |
|---|---|---|---|
| 2014/0359381 A1* | 12/2014 | Takeuchi | G06F 11/073 714/704 |
| 2016/0041596 A1* | 2/2016 | Alcantara | G06F 1/3268 713/320 |
| 2017/0131948 A1* | 5/2017 | Hoang | G06F 3/0679 |
| 2018/0060192 A1* | 3/2018 | Eggert | G06F 11/3034 |
| 2018/0181454 A1* | 6/2018 | Lin | G06F 11/0793 |
| 2019/0212940 A1* | 7/2019 | Cai | G06F 3/064 |

OTHER PUBLICATIONS

"Flash memory", Mar. 22, 2020, Wikipedia, as preserved by the Internet Archive on Mar. 22, 2020, pp. 1-19 http://web.archive.org/web/20200322215841/https://en.wikipedia.org/wiki/Flash_ (Year: 2020).*

(Continued)

*Primary Examiner* — Curtis James Kortman
(74) *Attorney, Agent, or Firm* — McDermott Will & Emery LLP

(57) ABSTRACT

In one or more embodiments, one or more systems, one or more methods, and/or one or more processes may receive a scaling factor and a retention time power law coefficient associated with a solid state drive (SSD); determine a first raw bit error rate (RBER) value for the SSD at a first time; extrapolate a second time at which a second RBER value for the SSD would reach a maximum RBER value if left unpowered, based at least on the first raw bit error rate value, the scaling factor, and the retention time power law coefficient; and provide the second time at which the second RBER value for the SSD would reach the maximum raw bit error rate value if left unpowered to at least one of an information handling system (IHS), IHS firmware, a baseboard management controller of the IHS, and an application executing on the IHS.

17 Claims, 5 Drawing Sheets

(56) References Cited

OTHER PUBLICATIONS

"particular", Apr. 11, 2021, Merriam-Webster, as preserved by the internet archive on Apr. 11, 2021, pp. 1-25 https://web.archive.org/web/20210411005959/https://www.merriam-webster.com/dictionary/particular (Year: 2021).*

N. R. Mielke, R. E. Frickey, I. Kalastirsky, M. Quan, D. Ustinov and V. J. Vasudevan, "Reliability of Solid-State Drives Based on NAND Flash Memory," in Proceedings of the IEEE, vol. 105, No. 9, pp. 1725-1750, Sep. 2017, doi: 10.1109/JPROC.2017.2725738. (Year: 2017).*

JEDEC Standard, Solid-State Drive (SSD) Requirements and Endurance Test Method, JESD218B.01, Mar. 2016.

* cited by examiner

SYSTEM AND METHOD OF FORECASTING AN AMOUNT OF TIME A SOLID STATE DRIVE CAN BE UNPOWERED

BACKGROUND

Field of the Disclosure

This disclosure relates generally to information handling systems and more particularly to forecasting an amount of time a solid state drive can be unpowered without losing data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more methods may determine a first raw bit error rate value at a first time for a first solid state drive that has reached a maximum number of program-erase cycles; may determine multiple raw bit error rate values for the first solid state drive at respective multiple times after the first time; may determine a scaling factor and a retention time power law coefficient associated with the first solid state drive; may receive the scaling factor and the retention time power law coefficient; may determine a second raw bit error rate value for the second solid state drive at a second time; may extrapolate a time at which a third raw bit error rate for the second solid state drive would reach a maximum raw bit error rate value if left unpowered, based at least on the second raw bit error rate value, the scaling factor, and the retention time power law coefficient; and may provide the time at which the third raw bit error rate for the second solid state drive would reach the maximum raw bit error rate value if left unpowered to at least one of an information handling system, information handling system firmware, a baseboard management controller of the information handling system, and an application executing on the information handling system. In one or more embodiments, when the solid state drive reaches the maximum raw bit error rate value, an error correction process of the solid state drive can no longer correct errors caused by utilization of the solid state drive.

In one or more embodiments, at least one non-volatile storage device of the second solid state drive may include at least one NAND flash storage device. For example, the at least one NAND flash storage device includes at least one of a triple-level cell (TLC) NAND flash memory and a quad-level cell (QLC) NAND flash memory. In one or more embodiments, the one or more systems, the one or more methods, and/or the one or more methods may further configure a display mounted in a housing of the second solid state drive with a date associated with the time at which the raw bit error rate for the solid state drive would reach the maximum raw bit error rate value if left unpowered.

In one or more embodiments, determining the scaling factor and the retention time power law coefficient associated with the first solid state drive may include curve fitting the first raw bit error rate value (RBER0) and the multiple raw bit error rate values (RBER(t) values) to an equation:

$$RBER(t)=RBER_0+(S \cdot t^m),$$

to determine the scaling factor as S and the retention time power law coefficient as m. For example, the one or more systems, the one or more methods, and/or the one or more methods may further: set RBER(t) of the equation to the maximum raw bit error rate value; and determine t as the time at which the third raw bit error rate for the second solid state drive would reach the maximum raw bit error rate value if left unpowered. For instance, a controller of the second solid state drive may set RBER(t) of the equation to the maximum raw bit error rate value; and determine t as the time at which the third raw bit error rate for the second solid state drive would reach the maximum raw bit error rate value if left unpowered.

In one or more embodiments, the one or more systems, the one or more methods, and/or the one or more methods may further receive a query for the time at which the third raw bit error rate value for the solid state drive would reach the maximum raw bit error rate value if left unpowered. In one or more embodiments, extrapolating the time at which the third raw bit error rate value for the second solid state drive would reach the maximum raw bit error rate value if left unpowered may include determining t as the time at which the third raw bit error rate for the second solid state drive would reach the maximum raw bit error rate value if left unpowered from an equation:

$$RBER(t)=RBER_0+(S \cdot t^m),$$

utilizing the scaling factor as S, the retention time power law coefficient as m, the maximum raw bit error rate value as RBER(t), and the raw bit error rate value for the solid state drive at the first time as $RBER_0$.

In one or more embodiments, one or more systems, one or more methods, and/or one or more methods may receive a scaling factor and a retention time power law coefficient associated with a solid state drive; may determine a raw bit error rate value for the solid state drive at a first time; may extrapolate a time at which a second raw bit error rate value for the solid state drive would reach a maximum raw bit error rate value if left unpowered, based at least on the first raw bit error rate value, the scaling factor, and the retention time power law coefficient; may query the solid state drive for the time at which the second raw bit error rate value for the solid state drive would reach the maximum raw bit error rate value if left unpowered; and may provide the time at which the second raw bit error rate value for the solid state drive would reach the maximum raw bit error rate value if left unpowered to at least one of an information handling system, information handling system firmware, a baseboard management controller of the information handling system, and an application executing on the information handling system. In one or more embodiments, when the solid state drive reaches the maximum raw bit error rate value, an error correction process of the solid state drive can no longer correct errors caused by utilization of the solid state drive.

In one or more embodiments, the solid state drive may include at least one NAND flash storage device. For example, the at least one NAND flash storage device includes at least one of a TLC NAND flash memory and a QLC NAND flash memory. In one or more embodiments, the one or more systems, the one or more methods, and/or the one or more methods may further configure a display mounted in a housing of the solid state drive with a date associated with the time at which the third raw bit error rate for the solid state drive would reach the maximum raw bit error rate value if left unpowered. For example, a controller of the solid state drive may configure a display mounted in a housing of the second solid state drive with a date associated with the time at which the second raw bit error rate for the solid state drive would reach the maximum raw bit error rate value if left unpowered.

In one or more embodiments, a solid state drive may include a controller and at least one non-volatile storage device coupled to the controller, among others. For example, the controller may receive a scaling factor and a retention time power law coefficient associated with the solid state drive; may determine a first raw bit error rate value for the solid state drive at a first time; may extrapolate a second time at which a second raw bit error rate value for the solid state drive would reach a maximum raw bit error rate value if left unpowered, based at least on the first raw bit error rate value, the scaling factor, and the retention time power law coefficient; and may provide the second time at which the second raw bit error rate value for the solid state drive would reach the maximum raw bit error rate value if left unpowered to at least one of an information handling system, information handling system firmware, a baseboard management controller of the information handling system, and an application executing on the information handling system.

In one or more embodiments, the at least one non-volatile storage device may include at least one NAND flash storage device. For example, the at least one NAND flash storage device includes at least one of a TLC NAND flash memory and a QLC NAND flash memory. In one or more embodiments, the controller may further configure a display mounted in a housing of the solid state drive with a date associated with the second time at which the raw bit error rate for the solid state drive would reach the maximum raw bit error rate value if left unpowered.

In one or more embodiments, extrapolating the second time at which the second raw bit error rate value for the solid state drive would reach the maximum raw bit error rate value if left unpowered may include determining t as the second time at which the third raw bit error rate for the solid state drive would reach the maximum raw bit error rate value if left unpowered from an equation:

$$RBER(t)=RBER_0+(S \cdot t^m),$$

utilizing the scaling factor as S, the retention time power law coefficient as m, the maximum raw bit error rate value as RBER(t), and the raw bit error rate value for the solid state drive at the first time as $RBER_0$. In one or more embodiments, the controller may further receive a query for the second time at which the raw bit error rate for the solid state drive would reach the maximum raw bit error rate value if left unpowered.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
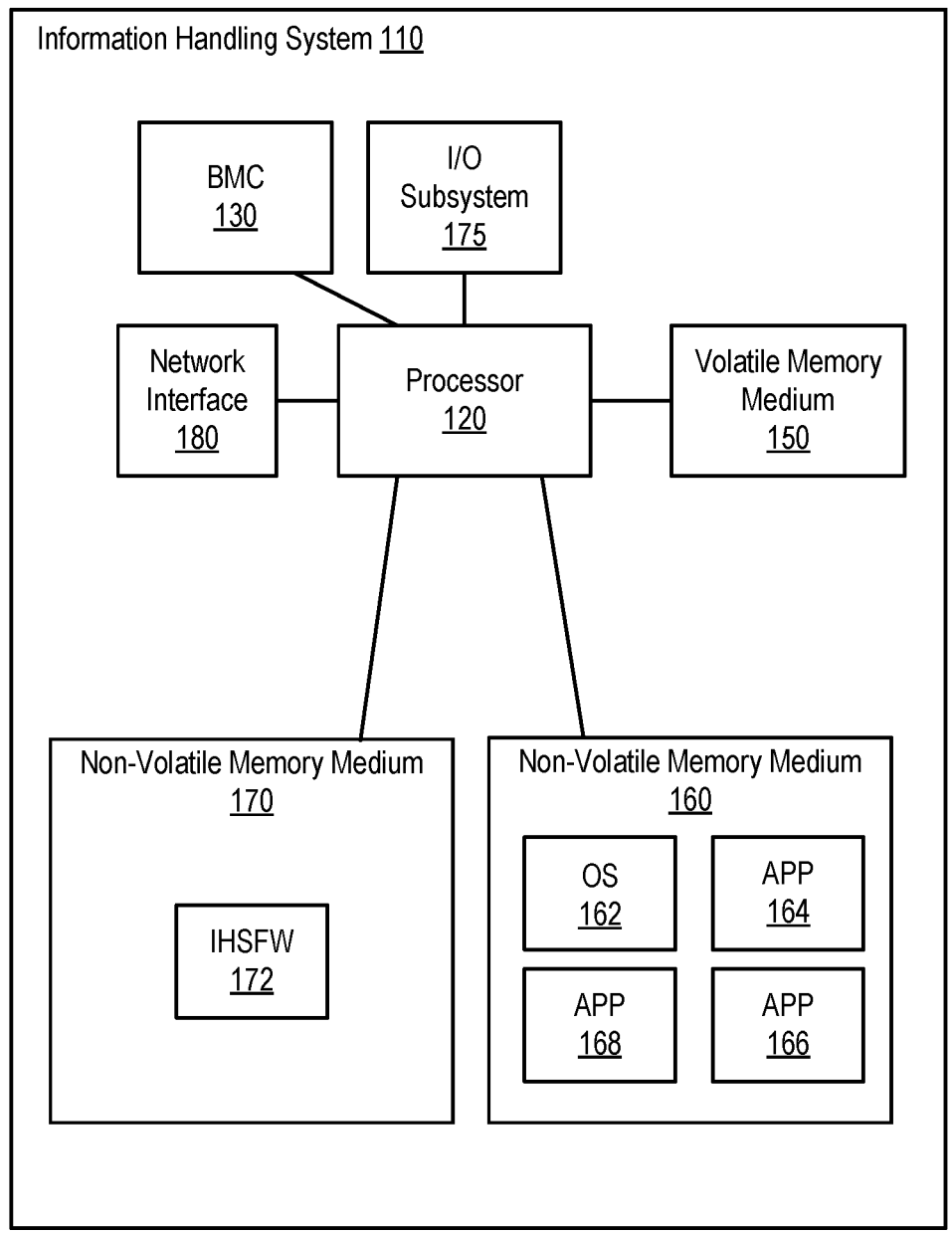
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, data retention of an unpowered solid state drive (SSD) may be a key metric which can define how long the unpowered SSD will protect against data loss. For example, a data retention capability of the SSD may decrease over time, if the SSD is not powered. In one or more embodiments, data retention of an unpowered SSD may typically be measured in years if the unpowered SSD is new. For example, the data retention of a new unpowered SSD may be seven years.

In one or more embodiments, NAND flash memory may be utilized to implement solid state drives (SSDs). In one or more embodiments, different SSDs may be implemented with different technologies. For example, a number of bits stored on a cell of a NAND flash memory may determine a type of NAND flash memory utilized to implement a SSD. In one instance, single-level cell (SLC) NAND flash memory may include one bit per cell. In a second instance, multi-level cell (MLC) may include two bits per cell, which may double a storage capacity. In a third instance, triple-level cell (TLC) may include three bits per cell, which may triple a storage capacity. In another instance, quad-level cell (QLC) may include four bits per cell, which may quadruple a storage capacity.

In one or more embodiments, NAND flash memory cells may have a finite number of program-erase (P/E) cycles (e.g., write cycles) before the NAND flash memory cells wear out (e.g., become unusable to reliably store data). In one or more embodiments, a density of a NAND flash memory cell may affect an endurance (e.g., a number of P/E cycles) of the NAND flash memory cell. For example, higher density NAND flash memory cells may have less endurance than low-density NAND flash memory cells. In one instance, MLC NAND flash memory cells may have greater endurance than TLC NAND flash memory cells. In another instance, TLC NAND flash memory cells may have greater endurance than QLC NAND flash memory cells.

In one or more embodiments, data retention of an unpowered SSD may typically be measured in months if the unpowered SSD is at its end of life (e.g., nearing a maximum number of P/E cycles). For example, the data retention of an end of life unpowered QLC SSD may be reduced to one month. In one or more embodiments, data retention of unpowered SSDs may be important in scenarios where the SSDs are powered down and are moved from a first physical location to a second physical location. For example, the SSDs may not be powered for multiple months.

In one or more embodiments, a SSD that includes QLC NAND flash memory may likely only have one month of data retention at its end of life if left unpowered. For example, this may pose a challenge to users of SSDs, which include NAND flash memory, who move storage systems as various technologies utilized to implement SSDs may be more prone to data loss. In one instance, this may pose a challenge if the SSDs are implemented with QLC NAND flash memory. In another instance, this may pose a challenge if users of SSDs are considering adopting SSDs that are implemented with QLC NAND flash memory.

In one or more embodiments, one or more systems, one or more methods, and/or one or more processes may utilize predictions of data retention for unpowered SSDs. For example, a prediction of unpowered data retention may enable users of SSDs to power down data storage systems for a forecasted amount of time (e.g., a predicted amount of time). For instance, if power is provided to the SSDs within the forecasted amount of time no data will be lost from the SSDs. In one or more embodiments, determining the prediction of unpowered data retention may include utilizing NAND flash data retention characterization data, an error correction method that can determine an error correction capability of a SSD, and NAND flash "health" metrics associated with the SSD, among others.

In one or more embodiments, the NAND flash data retention characterization data may be determined by a manufacturer of the NAND flash memory utilized by the SSD. For example, the NAND flash data retention characterization data may be determined by a process that utilizes the NAND flash memory to a one-hundred percent (100%) rated P/E count and then determining a raw bit error rate (RBER) at various unpowered data retention intervals. For instance, RBER may be determined via $$RBER(t) = RBER_0 + (S \cdot t^m),$$

where $RBER_0$ is RBER measured prior to power down (e.g., at a beginning of a data retention period), $S$ is a scaling factor (which may depend on flash generation), $t$ is retention time, and $m$ is retention time power law coefficient (e.g., 1.0-2.0). In one or more embodiments, different generations of SSDs that utilize different generation of NAND flash may utilize one or more other equations and/or may utilize one or more other curve fitting equations.

In one or more embodiments, a RBER associated with NAND flash memory may increase as P/E cycles increase. For example, P/E cycles may cause cells of the NAND flash memory to degrade, which may cause writing and/or reading data errors to occur. In one or more embodiments, a SSD may monitor one or more flash "health" metrics. For example, the flash health metrics may include one or more of a P/E count, a RBER, and a percentage of NAND flash memory life utilized, among others.

In one or more embodiments, before a SSD powers down, the SSD may determine a current value of RBER. For example, this value may be utilized as $RBER_0$. For instance, a forecasted amount of time for unpowered data retention of the SSD may be determined via extrapolating RBER, determined from the equation above, to an end of life for the SSD. In one or more embodiments, the SSD may provide the forecasted amount of time for the unpowered data retention of the SSD when queried. For example, the SSD may provide the forecasted amount of time for the unpowered data retention of the SSD to one or more of a processor of an information handling system, a baseboard management controller of the information handling system, an information handling system firmware of the information handling system, and an application executed by the information handling system, among others.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2A:
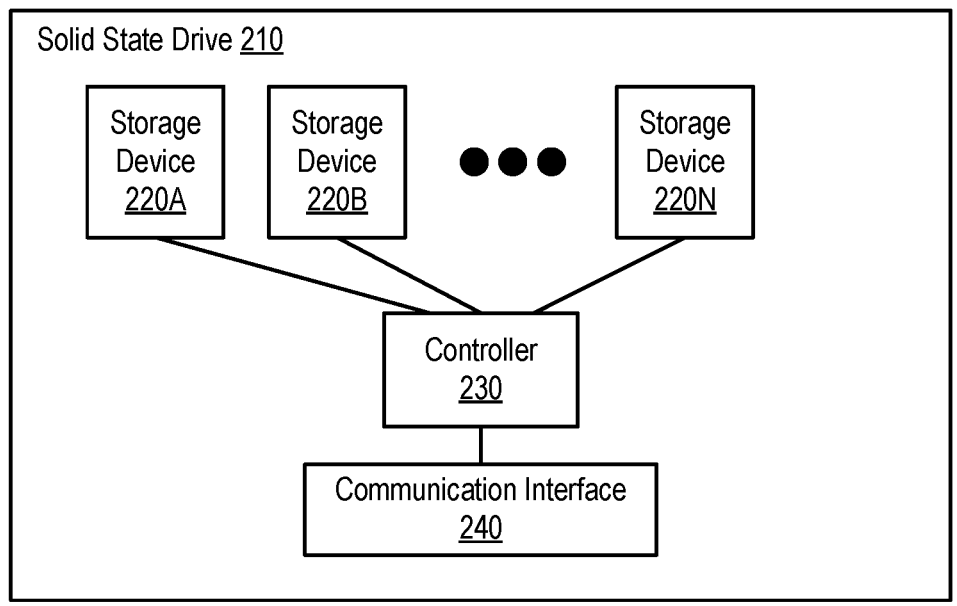
FIG. 2A illustrates an example of a solid state drive, according to one or more embodiments.

Turning now to FIG. 2A, an example of a solid state drive is illustrated, according to one or more embodiments. In one or more embodiments, a SSD 210 may include one or more storage devices. For example, SSD 210 may include storage devices 220A-220N. For instance, a storage devices 220 may be or may include a non-volatile storage device. As an example, a non-volatile storage device may continue to store data when power is removed from the non-volatile storage device. For instance, a storage devices 220 may continue to store data when power is removed from storage devices 220. Although SSD 210 is illustrated as including storage devices 220A-220N, SSD 210 may include any number of storage devices 220. In one or more embodiments, a storage device 220 may include flash memory. For example, a storage device 220 may include NAND flash memory. For instance, a storage device 220 may include SLC NAND flash memory, MLC NAND flash memory, TLC NAND flash memory, or QLC NAND flash memory, among others.

In one or more embodiments, SSD 210 may include a controller 230. For example, storage devices 220A-220N may be communicatively coupled to controller 230. In one or more embodiments, controller 230 may implement at least a portion of one or more systems, at least a portion of one or more flowcharts, at least a portion of one or more methods, and/or at least a portion of one or more processes described herein. In one example, controller 230 may include a processor. For instance, the processor of controller 230 may execute processor instructions in implementing at least a portion of one or more systems, at least a portion of one or more flowcharts, at least a portion of one or more methods, and/or at least a portion of one or more processes described herein. In a second example, controller 230 may include a FPGA. For instance, the FPGA of controller 230 may be configured to implement at least a portion of one or more systems, at least a portion of one or more flowcharts, at least a portion of one or more methods, and/or at least a portion of one or more processes described herein. In another example, controller 230 may include an ASIC. For instance, the ASIC of controller 230 may be configured to implement at least a portion of one or more systems, at least a portion of one or more flowcharts, at least a portion of one or more methods, and/or at least a portion of one or more processes described herein.

In one or more embodiments, SSD 210 may include a communication interface 240. For example, controller 230 may be communicatively coupled to communication interface 240. In one or more embodiments, communication interface 240 may be utilized to provide data to and/or receive data from one or more components of IHS 110. In one example, communication interface 240 may be utilized to provide data to and/or receive data from processor 120. In one instance, communication interface 240 may include a PCIe interface. In a second instance, communication interface 240 may include a SATA interface. In a third instance, communication interface 240 may include an external SATA (eSATA) interface. In another instance, communication interface 240 may include a SAS interface. In another example, communication interface 240 may be utilized to provide data to and/or receive data from a storage device 220.

Figure 2B:
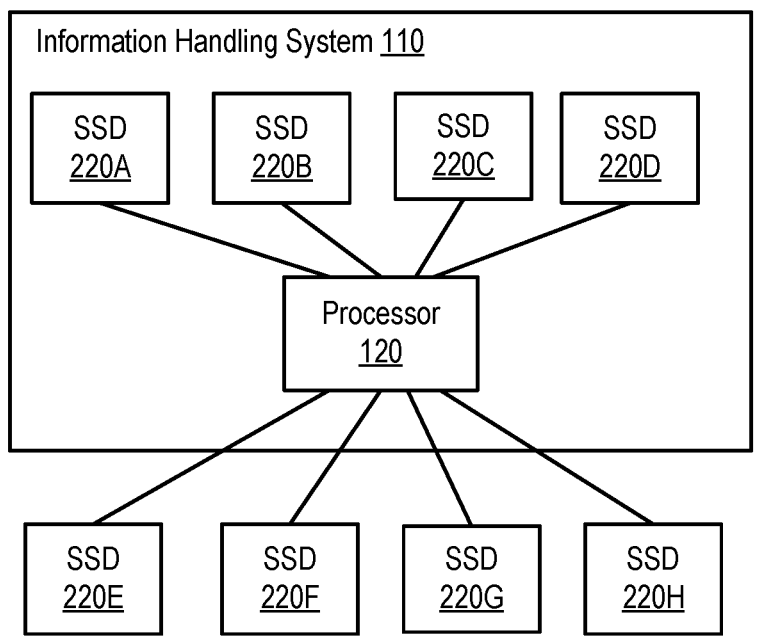
FIG. 2B illustrates an example of an information handling system and solid state drives, according to one or more embodiments.

Turning now to FIG. 2B, an example of an information handling system and solid state drives is illustrated, according to one or more embodiments. In one or more embodiments, IHS 110 may include one or more solid state drives. For example, IHS 110 may include SSDs 210A-210D. For example, SSDs 210A-210D may be communicatively coupled to processor 120. Although FIG. 2B illustrates IHS 110 as including SSDs 210A-210D, IHS 110 may include any number of SSDs 210, according to one or more embodiments. In one or more embodiments, IHS 110 may be communicatively coupled to one or more solid state drives that are external to IHS 110. For example, IHS 110 may be communicatively coupled to SSDs 210E-210H that are external to IHS 110. For instance, SSDs 210E-210H may be communicatively coupled to processor 120. Although FIG. 2B illustrates IHS 110 as being communicatively coupled to SSDs 210E-210H, IHS 110 may be communicatively coupled to any number of SSDs 210, according to one or more embodiments.

Figure 3A:
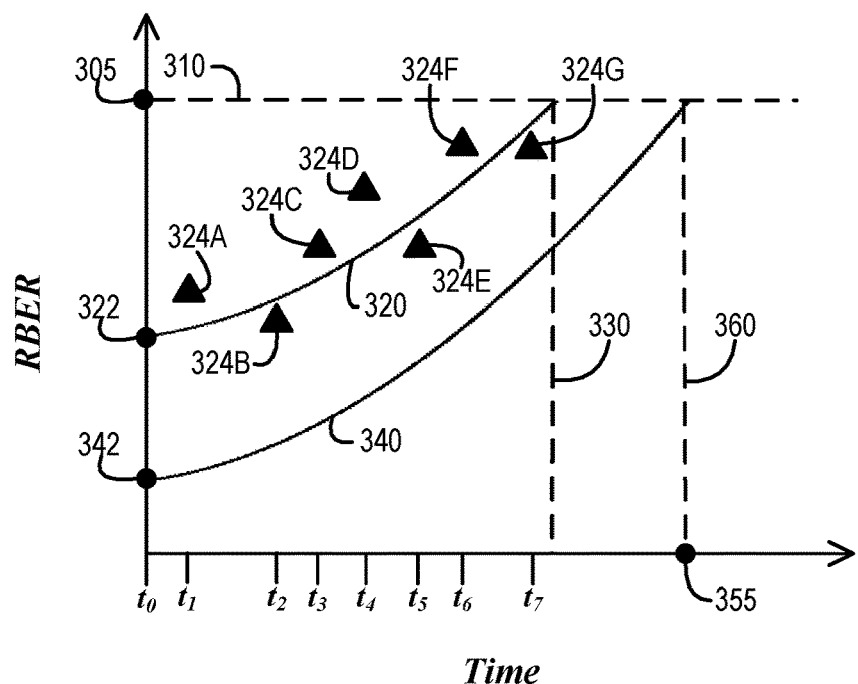
FIG. 3A illustrates an example of a graph of raw bit error rate of a solid state drive versus time, according to one or more embodiments.

Turning now to FIG. 3A, an example of a graph of raw bit error rate of a solid state drive versus time is illustrated, according to one or more embodiments. In one or more embodiments, a SSD may no longer be reliably utilized when a RBER associated with the SSD reaches a maximum RBER value 305, also shown by line 310. For example, a controller of the SSD may determine a RBER associated with a SSD. In one or more embodiments, a maximum RBER value 305 may be determined when a controller of a SSD can no longer correct for one or more errors. For example, a maximum RBER value 305 may be determined when an error correction process of a controller 230 of a SSD 210 can no longer correct for one or more errors generated when retrieving data from one or more of storage devices 220A-220N of SSD 210.

In one or more embodiments, a first SSD may be utilized to determine plot 320. For example, P/E cycles of the first SSD may be maximized. For instance, the first SSD may have a number of P/E cycles applied such that the first SSD has reached one hundred percent (100%) of the P/E cycles for the first SSD. In one or more embodiments, the first SDD may be unpowered for an amount of time, and a RBER associated with the first SDD may be determined. For example, this may be repeated at various amounts of time to determine plot 320. For instance, an equation may be determined for plot 320. As an example, the equation determined for plot 320 may be based at least on a regression method that utilizes RBER values respectively associated with the various amounts of time of the first SSD being unpowered. For instance, the regression method may be or may include a least squares fit method. In one or more embodiments, a first time when the first SSD reaches the maximum RBER may be determined, illustrated by line 330.

In one or more embodiments, a RBER value 322 may be determined as $RBER_0$, at a time $t_0$, and RBER values 324A-324G may be determined at respective times $t_1$-$t_7$. For example, plot 320 may be determined via curve fitting RBER values 322 and 324A-324G at respective times $t_0$-$t_7$ to $$RBER(t) = RBER_0 + (S \cdot t^m),$$

which may determine S and m. For instance, the curve fitting may include utilizing a least square fit method to determine values for S and m. In one or more embodiments, a manufacturer of one or more of the first SSD, a storage device 220 of the first SSD, and NAND flash memory utilized to implement a storage device 220 of the first SSD may provide S and/or m. Although RBER values 324A-324G are illustrated, any number of RBER values 324 at respective times may be utilized, according to one or more embodiments. For example, greater numbers of RBER values 324 at respective times may provide better accuracy when curve fitting.

In one or more embodiments, a second SSD may be utilized with an information handling system. For example, P/E cycles of the second SSD may not be maximized. For instance, the second SSD may not have a number of P/E cycles applied such that the second SSD has not reached one hundred percent (100%) of the P/E cycles for the second SSD. In one or more embodiments, a controller 230 of the second SSD may determine plot 340. For instance, controller 230 of the second SSD may determine plot 340 based at least on a current RBER before the second SSD is powered down. As an example, the current RBER before the second SSD is powered down may be utilized as a RBER value 342, which may be utilized RBER$_0$ to determined a maximum amount of time the second SSD may be unpowered without losing data.

In one or more embodiments, controller 230 of the second SSD may determine a time 355, also shown as a line 360, which may be the maximum amount of time the second SSD may be unpowered without losing data. For example, controller 230 of the second SSD may determine time 355 by solving for t in equation $$RBER(t)=RBER_0+(S \cdot t^m)$$

where RBER(t) is RBER value 305, RBER$_0$ is RBER value 342, and S and m are the values determined from the first SSD. In one instance, the time t (i.e., time 355) at which the raw bit error rate for the solid state drive would reach the maximum raw bit error rate value if left unpowered may be determined via $$t = \exp\left(\frac{\ln\left(\frac{RBER(t) - RBER_0}{S}\right)}{m}\right),$$

where RBER(t) is set to the maximum RBER value (e.g., maximum RBER value 305), RBER$_0$ is RBER value 342 (determined before the second SDD is powered off), and S and m are the values determined from the first SSD. In another instance, if m is 1.0, the time (i.e., time 355) at which the raw bit error rate for the solid state drive would reach the maximum raw bit error rate value if left unpowered may be determined via $$t = \frac{RBER(t) - RBER_0}{S},$$

where RBER(t) is set to the maximum RBER value (e.g., maximum RBER value 305), RBER$_0$ is RBER value 342 (determined before the second SDD is powered off), and S is the value determined from the first SSD.

Figure 3B:
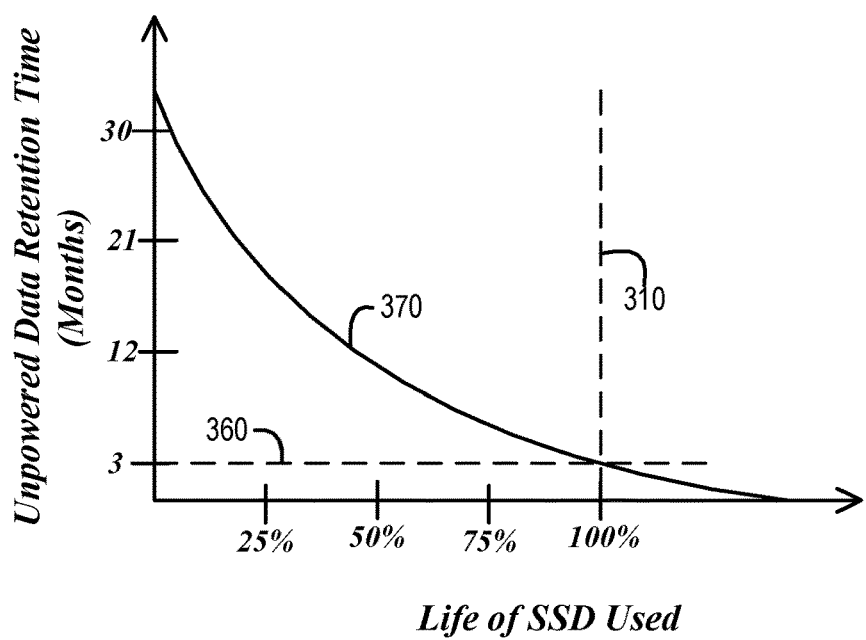
FIG. 3B illustrates an example of a plot of unpowered data retention time of a solid state drive versus a life of the solid state drive used, according to one or more embodiments.

Turning now to FIG. 3B, an example of a plot of unpowered data retention time of a solid state drive versus a life of the solid state drive used is illustrated, according to one or more embodiments. As shown, a plot 370 illustrates unpowered data retention time of SSD 210 versus a life of SSD 210. As illustrated, as SSD 210 is utilized, unpowered data retention time of SSD 210 may decrease. Although, plot 370 illustrates utilization beyond one-hundred percent (100%), the one-hundred percent (100%) utilization may be associated with a life of SSD 210 where SSD may reliably store and/or retrieve data from storage devices of SSD 210, according to one or more embodiments.

Figure 4:
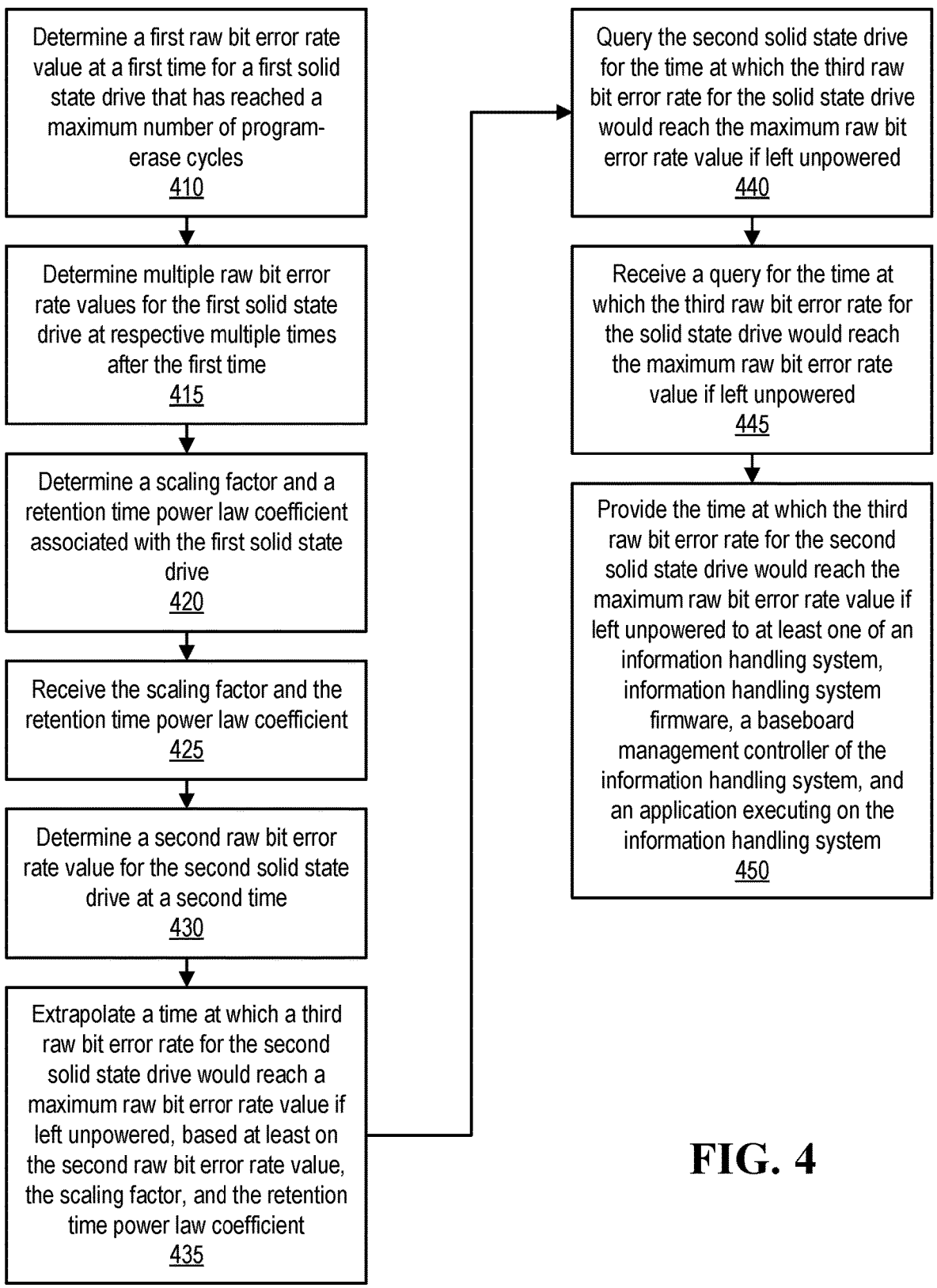
FIG. 4 illustrates an example of operating a solid state drive, according to one or more embodiments.

Turning now to FIG. 4, an example of operating a solid state drive is illustrated, according to one or more embodiments. At 410, a first raw bit error rate value may be determined at a first time for a first solid state drive that has reached a maximum number of program-erase cycles. For example, raw bit error rate value 322 may be determined at t$_0$ (as shown in FIG. 3A). At 415, multiple raw bit error rate values for the first solid state drive may be determined at respective multiple times after the first time. For example, multiple raw bit error rate values 324A-324G may be determined at respective multiple times t$_1$-t$_7$ after t$_0$ (as illustrated in FIG. 3A).

At 420, a scaling factor and a retention time power law coefficient associated with the first solid state drive may be determined. For example, a scaling factor S and a retention time power law coefficient m associated with the first solid state drive may be determined for an equation:

$$RBER(t)=RBER_0+(S \cdot t^m),$$

where RBER$_0$ is the first raw bit error rate value at the first time for the first solid state drive. For instance, determining the scaling factor and the retention time power law coefficient associated with the first solid state drive may include curve fitting the first raw bit error rate value (RBER$_0$) and the multiple raw bit error rate values (e.g., multiple raw bit error rate values 324A-324G as RBER(t) values) to this equation to determine the scaling factor as S and the retention time power law coefficient as m.

At 425, the scaling factor and the retention time power law coefficient may be received. For example, a controller of a second solid state drive, different from the first solid state drive, may receive the scaling factor and the retention time power law coefficient. For instance, the second solid state drive may not have reached the maximum number of program-erase cycles. In one or more embodiments, while the second solid state drive may be physically different from the first solid state drive, the second solid state drive and the first solid state drive may include one or more storage devices 220 from a same manufacturer. For example, one or more characteristics determined for the first solid state drive may be applicable to the second solid state drive. For instance, the scaling factor and the retention time power law coefficient determined for the first solid state drive may be applicable to the second solid state drive. In one or more embodiments, while the second solid state drive may be physically different from the first solid state drive, the second solid state drive and the first solid state drive may include one or more storage devices 220 that utilize NAND flash memory from a same manufacturer. For example, one or more characteristics determined for the first solid state drive may be applicable to the second solid state drive. For instance, the NAND flash memory from the same manufacturer may include at least one of a TLC NAND flash memory and a QLC NAND flash memory.

At 430, a second raw bit error rate value for the second solid state drive may be determined at a second time. For example, the controller of the second solid state drive may determine a second raw bit error rate value for the second solid state drive at a second time. At 435, a time at which a third raw bit error rate for the second solid state drive would reach a maximum raw bit error rate value if left unpowered may be extrapolated based at least on the second raw bit error rate value, the scaling factor, and the retention time power law coefficient. For example, the controller of the second solid state drive may extrapolate a time at which a third raw bit error rate for the second solid state drive would reach a maximum raw bit error rate value if left unpowered, based at least on the second raw bit error rate value, the scaling factor, and the retention time power law coefficient.

At 440, the second solid state drive may be queried for the time at which the third raw bit error rate for the solid state drive would reach the maximum raw bit error rate value if left unpowered. For example, at least one of an information handling system, information handling system firmware, a baseboard management controller of the information handling system, and an application executing on the information handling system may query the second solid state drive for the time at which the third raw bit error rate for the solid state drive would reach the maximum raw bit error rate value if left unpowered.

At 445, a query for the time at which the third raw bit error rate for the solid state drive would reach the maximum raw bit error rate value if left unpowered may be received. For example, the controller of the second solid state drive may receive a query for the time at which the third raw bit error rate for the solid state drive would reach the maximum raw bit error rate value if left unpowered.

At 450, the time at which the third raw bit error rate for the second solid state drive would reach the maximum raw bit error rate value if left unpowered may be provided to at least one of an information handling system, information handling system firmware, a baseboard management controller of the information handling system, and an application executing on the information handling system. For example, the controller of the second solid state drive may provide the time at which the third raw bit error rate for the second solid state drive would reach the maximum raw bit error rate value if left unpowered to at least one of an information handling system, information handling system firmware, a baseboard management controller of the information handling system, and an application executing on the information handling system.

Figure 5:
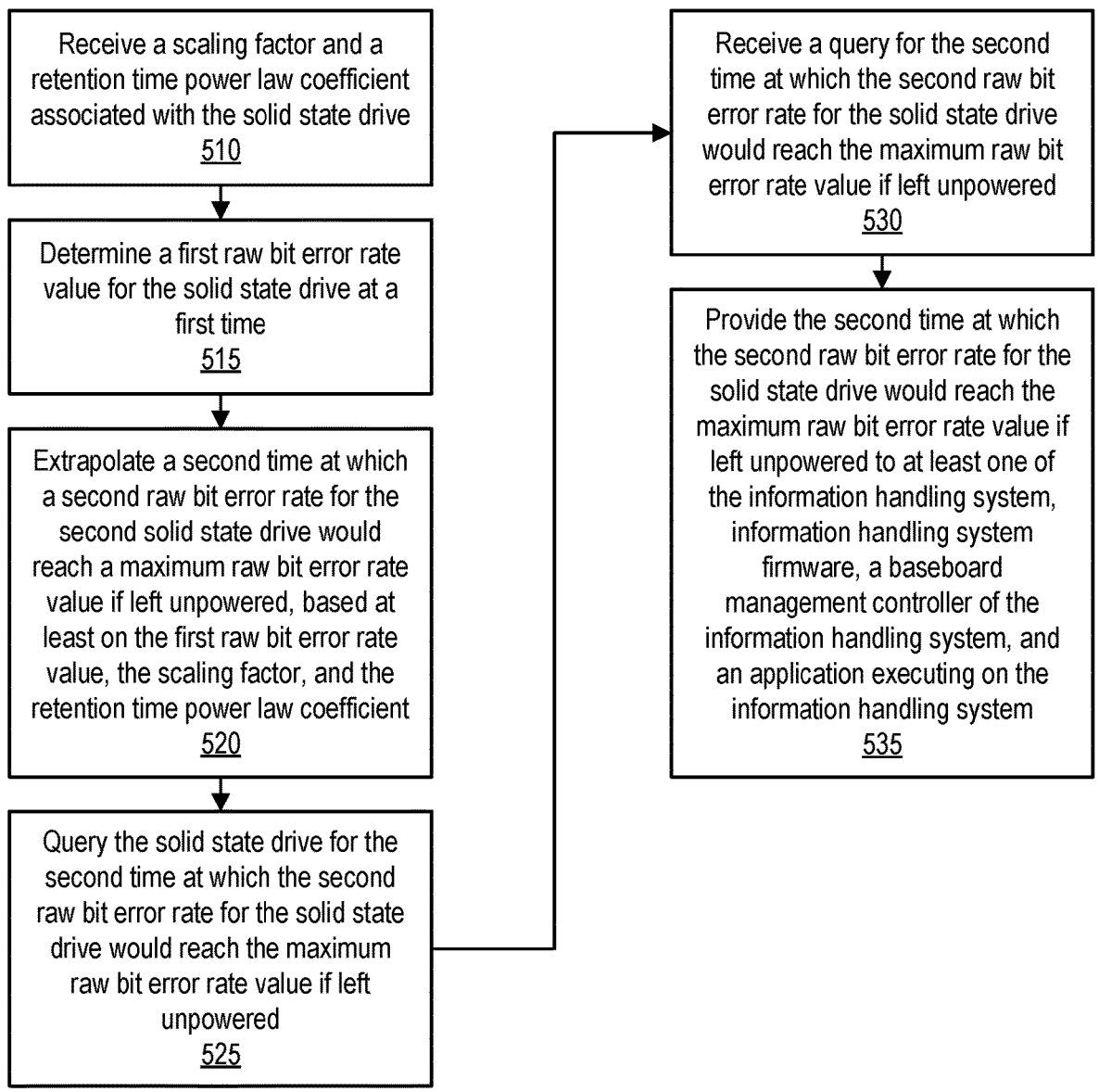
FIG. 5 illustrates an example of utilizing a solid state drive, according to one or more embodiments.

Turing now to FIG. 5, an example of utilizing a solid state drive is illustrated, according to one or more embodiments. At 510, a scaling factor and a retention time power law coefficient associated with a solid state drive may be received. For example, solid state drive 210 may receive a scaling factor and a retention time power law coefficient associated with solid state drive 210. For instance, controller 210 of solid state drive 210 may receive a scaling factor and a retention time power law coefficient associated with solid state drive 210. In one or more embodiments, a maximum raw bit error rate value associated with the solid state drive may be received. For example, solid state drive 210 may receive a maximum raw bit error rate value associated with the solid state drive. For instance, controller 210 of solid state drive 210 may receive a maximum raw bit error rate value associated with the solid state drive.

At 515, a first raw bit error rate value for the solid state drive may be determined at a first time. For example, raw bit error rate value 342 may be determined at to (as shown in FIG. 3A). In one instance, solid state drive 210 may determine raw bit error rate value 342 before solid state drive 210 is powered down. In another instance, controller 230 may determine raw bit error rate value 342 before solid state drive 210 is powered down.

At 520, a second time at which a second raw bit error rate value for the second solid state drive would reach the maximum raw bit error rate value if left unpowered may be extrapolated based at least on the first raw bit error rate value, the scaling factor, and the retention time power law coefficient. For example, solid state drive 210 may extrapolate a second time (e.g., time 355 as shown in FIG. 3A) at which a second raw bit error rate value for the second solid state drive would reach the maximum raw bit error rate value (e.g., maximum RBER value 305) if left unpowered, based at least on the first raw bit error rate value, the scaling factor, and the retention time power law coefficient. For instance, controller 230 may extrapolate a second time (e.g., time 355 as shown in FIG. 3A) at which a second raw bit error rate value for the second solid state drive would reach the maximum raw bit error rate value (e.g., maximum RBER value 305) if left unpowered, based at least on the first raw bit error rate value, the scaling factor, and the retention time power law coefficient. In one or more embodiments, when the solid state drive reaches the maximum raw bit error rate value, an error correction process of the solid state drive can no longer correct errors caused by utilization of the solid state drive. For example, when the solid state drive reaches the maximum raw bit error rate value, an error correction process of a controller of the solid state drive can no longer correct errors caused by utilization of the solid state drive.

In one or more embodiments, extrapolating the second time at which the second raw bit error rate value for the second solid state drive would reach the maximum raw bit error rate value if left unpowered may include determining t as the second time at which the third raw bit error rate for the second solid state drive would reach the maximum raw bit error rate value if left unpowered from an equation:

$$RBER(t) = RBER_0 + (S \cdot t^m),$$

utilizing the scaling factor as S, the retention time power law coefficient as m, the maximum raw bit error rate value as $RBER(t)$, and the raw bit error rate value for the solid state drive at the first time as $RBER_0$. For example, t may be determined as the second time at which the third raw bit error rate for the second solid state drive would reach the maximum raw bit error rate value if left unpowered from another equation (based at least on the previous equation):

$$t = \exp\left(\frac{\ln\left(\frac{RBER(t) - RBER_0}{S}\right)}{m}\right),$$

utilizing the scaling factor as S, the retention time power law coefficient as m, the maximum raw bit error rate value as $RBER(t)$, and the raw bit error rate value for the solid state drive at the first time as $RBER_0$.

At 525, the solid state drive may be queried for the second time at which the second raw bit error rate value for the solid state drive would reach the maximum raw bit error rate value if left unpowered. For example, at least one of an information handling system, information handling system firmware, a baseboard management controller of the information handling system, and an application executing on the information handling system may query the solid state drive for the second time at which the second raw bit error rate value for the solid state drive would reach the maximum raw bit error rate value if left unpowered.

At 530, a query for the second time at which the second raw bit error rate value for the solid state drive would reach the maximum raw bit error rate value if left unpowered may be received. For example, solid state drive 210 may receive a query for the second time at which the second raw bit error rate value for the solid state drive would reach the maximum raw bit error rate value if left unpowered. For instance, controller 230 may receive a query for the second time at which the second raw bit error rate value for the solid state drive would reach the maximum raw bit error rate value if left unpowered.

At 535, the second time at which the second raw bit error rate value for the solid state drive would reach the maximum raw bit error rate value if left unpowered may be provided to at least one of the information handling system, information handling system firmware, a baseboard management controller of the information handling system, and an application executing on the information handling system. For example, solid state drive 210 may provide the second time at which the second raw bit error rate value for the solid state drive would reach the maximum raw bit error rate value if left unpowered to at least one of the information handling system, information handling system firmware, a baseboard management controller of the information handling system, and an application executing on the information handling system. For instance, controller 230 may provide the second time at which the second raw bit error rate value for the solid state drive would reach the maximum raw bit error rate value if left unpowered to at least one of the information handling system, information handling system firmware, a baseboard management controller of the information handling system, and an application executing on the information handling system.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    at least one processor;
    a memory medium, coupled to the at least one processor, storing instructions executable by the at least one processor;
    a first solid state drive coupled to the at least one processor and including at least one first non-volatile storage device; and
    a second solid state drive coupled to the at least one processor and including at least one second non-volatile storage device, wherein the second solid state drive is physically different from the first solid state drive;
    wherein the first solid state drive is configured to:
        determine a first raw bit error rate value of the first solid state drive at a first time; and
        determine, based on the first raw bit error rate value of the first solid state drive, a scaling factor associated with the first solid state drive and a retention time power law coefficient associated with the first solid state drive;
    wherein the second solid state drive is configured to:
        receive the scaling factor associated with the first solid state drive and the retention time power law coefficient associated with the first solid state drive; and
        extrapolate a time at which a second raw bit error rate value for the second solid state drive would reach a maximum raw bit error rate value if left unpowered, based at least on the first raw bit error rate value, the scaling factor associated with the first solid state drive, and the retention time power law coefficient associated with the first solid state drive;
    wherein the instructions, which when executed by the at least one processor, cause the information handling system to:
        query the second solid state drive for the extrapolated time at which the second raw bit error rate value for the second solid state drive would reach the maximum raw bit error rate value if left unpowered; and
    wherein the second solid state drive is further configured to:
        provide the extrapolated time at which the second raw bit error rate value for the second solid state drive would reach the maximum raw bit error rate value if left unpowered to at least one of the information handling system, information handling system firmware, a baseboard management controller of the information handling system, and an application executing on the information handling system;
        maintain data at the second solid state drive up to the extrapolated time when the second solid state drive is left unpowered; and
        perform, by a controller of the second solid state drive, an error correction process of the data prior to the extrapolated time.

2. The information handling system of claim 1, wherein the at least one first non-volatile storage device includes at least one NAND flash storage device.

3. The information handling system of claim 2, wherein the at least one NAND flash storage device includes at least one of a triple-level cell (TLC) NAND flash memory and a quad-level cell (QLC) NAND flash memory.

4. The information handling system of claim 1, wherein the second solid state drive is further configured to receive a query for the extrapolated time at which the second raw bit error rate value for the second solid state drive would reach the maximum raw bit error rate value if left unpowered.

5. The information handling system of claim 1, wherein, to extrapolate the time at which the second raw bit error rate value for the second solid state drive would reach the maximum raw bit error rate value if left unpowered, the second solid state drive is further configured to:

determine t as the extrapolated time at which the second raw bit error rate for the second solid state drive would reach the maximum raw bit error rate value if left unpowered from an equation:

$$RBER(t)=RBER_0+(S \cdot t^m),$$

utilizing the scaling factor associated with the first solid state drive as S, the retention time power law coefficient as m, the maximum raw bit error rate value as RBER(t), and the raw bit error rate value for the first solid state drive at the first time as $RBER_0$.

6. The method of claim 1, wherein, when the second solid state drive reaches the maximum raw bit error rate value, an error correction process of the second solid state drive can no longer correct errors caused by utilization of the second solid state drive.

7. A method, comprising:
determining, by a first solid state drive, a first raw bit error rate value at a first time of the first solid state drive, wherein the first solid state drive has reached a maximum number of program-erase cycles;
determining a plurality of raw bit error rate values of the first solid state drive at a plurality of respective times after the first time;
determining, by the first solid state drive and based on the plurality of raw bit error values of the first solid state drive, a scaling factor associated with the first solid state drive and a retention time power law coefficient associated with the first solid state drive;
receiving, by a controller of a second solid state drive, the scaling factor associated with the first solid state drive and the retention time power law coefficient associated with the first solid state drive, wherein the second solid state drive is physically different from the first solid state drive;
determining, by the controller of the second solid state drive, a second raw bit error rate value for the second solid state drive at a second time;
extrapolating, by the controller of the second solid state drive, a time at which a third raw bit error rate for the second solid state drive would reach a maximum raw bit error rate value if left unpowered, based at least on the second raw bit error rate value, the scaling factor associated with the first solid state drive, and the retention time power law coefficient associated with the first solid state drive;
providing, by the controller of the second solid state drive, the extrapolated time at which the third raw bit error rate for the second solid state drive would reach the maximum raw bit error rate value if left unpowered to at least one of an information handling system, information handling system firmware, a baseboard management controller of the information handling system, and an application executing on the information handling system;
maintaining data at the second solid state drive for up to the extrapolated time when the second solid state drive is left unpowered; and
performing, by the controller of the second solid state drive, an error correction process of the data prior to the extrapolated time.

8. The method of claim 7, wherein the second solid state drive includes at least one NAND flash storage device.

9. The method of claim 8, wherein the at least one NAND flash storage device includes at least one of a triple-level cell (TLC) NAND flash memory and a quad-level cell (QLC) NAND flash memory.

10. The method of claim 7, wherein the determining the scaling factor associated with the first solid state drive and the retention time power law coefficient associated with the first solid state drive includes curve fitting the first raw bit error rate value ($RBER_0$) and the plurality of raw bit error rate values (RBER(t) values) to an equation:

$$RBER(t)=RBER_0+(S \cdot t^m)$$

to determine the scaling factor associated with the first solid state drive as S and the retention time power law coefficient as m.

11. The method of claim 10, further comprising:
setting, by the controller of the second solid state drive, RBER(t) of the equation to the maximum raw bit error rate value; and
determining, by the controller of the second solid state drive, t as the extrapolated time at which the third raw bit error rate for the second solid state drive would reach the maximum raw bit error rate value if left unpowered.

12. The method of claim 7, wherein, when the second solid state drive reaches the maximum raw bit error rate value, an error correction process of the second solid state drive can no longer correct errors caused by utilization of the second solid state drive.

13. A computing environment, comprising:
a first solid state drive, including:
    a controller; and
    at least one non-volatile storage device coupled to the controller of the first solid state drive;
    wherein the controller of the first solid state drive is configured to:
        determine a first raw bit error rate value of the first solid state drive at a first time; and
        determine, based on the first raw bit error rate value of the first solid state drive, a scaling factor associated with the first solid state drive and a retention time power law coefficient associated with the first solid state drive;
a second solid state drive, including:
    a controller; and
    at least one non-volatile storage device coupled to the controller of the second solid state drive;
    wherein the controller of the second solid state drive is configured to:
        receive the scaling factor associated with the first solid state drive and the retention time power law coefficient associated with the first solid state drive, the second solid state drive is physically different from the first solid state drive;
        extrapolate a time at which a second raw bit error rate value of the second solid state drive would reach a maximum raw bit error rate value if left unpowered, based at least on the first raw bit error rate value, the scaling factor associated with the first solid state drive, and the retention time power law coefficient associated with the first solid state drive;
        provide the extrapolated time at which the second raw bit error rate value for the second solid state drive would reach the maximum raw bit error rate value if left unpowered to at least one of an information handling system, information handling system firmware, a baseboard management controller of the information handling system, and an application executing on the information handling system;

maintain data at the second solid state drive for up to the extrapolated time when the second solid state drive is left unpowered; and perform, by the controller of the second solid state drive, an error correction process of the data prior to the extrapolated time.

14. The computing environment of claim 13, wherein the at least one non-volatile storage device of the second solid state drive includes at least one NAND flash storage device.

15. The computing environment of claim 14, wherein the at least one NAND flash storage device includes at least one of a triple-level cell (TLC) NAND flash memory and a quad-level cell (QLC) NAND flash memory.

16. The computing environment of claim 13, wherein, to extrapolate the time at which the second raw bit error rate value for the second solid state drive would reach the maximum raw bit error rate value if left unpowered, the controller of the second solid state drive is further configured to:

determine t as the extrapolated time at which the second raw bit error rate for the second solid state drive would reach the maximum raw bit error rate value if left unpowered from an equation:

$$RBER(t)=RBER_0+(S \cdot t^m),$$

utilizing the scaling factor associated with the first solid state drive as S, the retention time power law coefficient as m, the maximum raw bit error rate value as RBER(t), and the first raw bit error rate value for the first solid state drive at the first time as $RBER_0$.

17. The computing environment of claim 13, wherein the controller of the second solid state drive is further configured to receive a query for the extrapolated time at which the second raw bit error rate for the second solid state drive would reach the maximum raw bit error rate value if left unpowered.

* * * * *